(12) United States Patent
Tamura et al.

(10) Patent No.: US 6,547,538 B1
(45) Date of Patent: Apr. 15, 2003

(54) ELECTRIC COMPRESSOR

(75) Inventors: Teruo Tamura, Nara (JP); Tatsuyuki Iizuka, Kanagawa (JP); Kenji Sasaki, Osaka (JP); Fumitoshi Saito, Kyoto (JP)

(73) Assignees: Matsushita Electric Industrial Co., Ltd. (JP); Matsushita Refrigeration Company (JP)

( * ) Notice: Subject to any disclaimer, the term of this patent is extended or adjusted under 35 U.S.C. 154(b) by 68 days.

(21) Appl. No.: 09/786,594

(22) PCT Filed: Jun. 30, 2000

(86) PCT No.: PCT/JP00/04322

§ 371 (c)(1),
(2), (4) Date: Jun. 15, 2001

(87) PCT Pub. No.: WO01/02728

PCT Pub. Date: Jan. 11, 2001

(30) Foreign Application Priority Data

Jul. 2, 1999 (JP) .......................................... 11-188762

(51) Int. Cl.[7] .............................................. F04B 35/04
(52) U.S. Cl. ..................................... 417/415; 417/902
(58) Field of Search ........................................ 417/415

(56) References Cited

U.S. PATENT DOCUMENTS 5,971,724 A * 10/1999 Choi ........................... 417/415
6,047,460 A * 4/2000 Nagate et al. ................. 29/598
6,095,768 A * 8/2000 Bianchi ....................... 417/415
6,184,597 B1 * 2/2001 Yamamoto et al. ........... 310/14
6,422,833 B1 * 7/2002 Park ............................ 417/363

FOREIGN PATENT DOCUMENTS

| JP | 10-318132 A | 12/1998 |
|---|---|---|
| JP | 11-303746 A | 11/1999 |
| JP | 2000-134882 A | 5/2000 |

* cited by examiner

Primary Examiner—Teresa Walberg
Assistant Examiner—Vinod D. Patel
(74) Attorney, Agent, or Firm—Rossi & Associates

(57) ABSTRACT

A compressor includes a compressing section accommodated in a hermetic container and a motor section, coupled to the compressing section, for driving the compressing section. The motor section has a bored section on an end of the compressing section side and a motor having two rotor poles and including a rotor core in which permanent magnets are buried. The compressing section includes a bearing made of non-magnetic material and extending inside the bored section. This structure reduces both of loss torque due to magnetic attraction between an inner wall of the bored section and the bearing, and eddy-current-loss in the bearing, so that a highly efficient compressor is obtainable.

6 Claims, 9 Drawing Sheets

ELECTRIC COMPRESSOR

TECHNICAL FIELD

The present invention relates to an electric compressor used in a freezer, refrigerator, or air-conditioner. More particularly it relates to a highly efficient electric compressor in which loss torque and iron loss due to magnetic attraction are reduced. The magnetic attraction is produced at a bearing in a compressing section jointed to a motor section of the compressor.

BACKGROUND ART

A prior art is described with reference to FIG. 7 where a reciprocal electric compressor is shown.

In FIG. 7, the compressor comprises hermetic container 1, compressing section 2 disposed at lower part of the container, and motor section 3 disposed above the compressing section. Shaft 4 mounted to rotor 14 of motor section 3 has crank 4a on its tip.

Cylinder block 5 formed of a casting made of iron system material comprises bearing 6, in which shaft 4 is inserted, and cylinder 7 formed at right angles with bearing 6.

Piston 9 is linked to crank 4a via connecting rod 8. When motor section 3 is driven, rotating movement of shaft 4 is converted to reciprocal movement by crank 4a, and delivered to piston 9 via rod 8, so that piston 9 slides with respect to inner wall of cylinder 7. Compressing chamber 10 is formed by cylinder 7 and piston 9. Oil pipe 11 is mounted to a tip of crank 4a, and lubricant 12 pooled at the bottom of hermetic container 1 is lubricated to compressing section 2 and shaft 4 through oil pipe 11, so that respective sliding sections move smoothly.

Motor 3 is a two-pole induction motor comprising the following elements: (a) stator 13 formed of winding-wound-iron-core made of laminated magnetic sheets, and (b) rotor 14 formed of rotor iron core 15 with a secondary conductor, the rotor iron core being made of laminated magnetic sheets.

Bored section 16 is provided at the end of rotor-iron-core 15 on the side of compressing section 2, and bearing 6 extends inside bored section 16.

An operation of the conventional reciprocal compressor of which structure is discussed above is described hereinafter.

When rotor 14 spins, piston 9 performs reciprocal movement via connecting rod 8 linked to crank 4a of shaft 4, so that piston 9 compresses coolant gas in compressing chamber 10. The compressed gas is discharged through a discharging pipe (not shown) to a system such as a freezer, refrigerator, or air-conditioner.

Regarding the lubrication to respective sliding sections such as bearing 6, cylinder 7, connecting rod 8 and piston 9 of compressing section 2, oil pipe 11 mounted to lower end of shaft 4 rotates and pumps up lubricant 12 for lubrication.

Recently, reducing the power consumption of freezers, refrigerators, and air-conditioners has drawn attention because of energy saving tendency, and lower profiles of those apparatuses have been studied because of downsizing requirement. The rotor is disposed as close as possible to the compressing section, and a part of bearing extends inside the bored section, thereby regulating undesirable rotating deflection of the rotor and lowering the total height of the compressor. Thus the downsizing requirement is satisfied. However, power saving of the motor, which consumes the largest power in the freezing system, has not yet arrived at a satisfactory level.

In the conventional two-pole induction motor used in compressors, magnetic steel sheets of lower iron loss has been employed, a shape of the core has been optimized, or volume of materials used has been increased, in order to raise the efficiency of the motor. The induction motor, however, needs the exciting power for forming a magnetic circuit in addition to the power for producing torque as well as rotating load. Accordingly, efficiency improvement of the motor tends to be saturated, and it is difficult to expect a further substantial improvement of the efficiency.

A self-starting-synchronous-type two-pole motor using permanent magnets draws attention as another measures for increasing the efficiency of the motor. Because the permanent magnets are buried in the rotor, thereby eliminating the exciting power.

An example of this self-starting-synchronous-motor is described with reference to FIGS. 8 and 9. Regarding the entire compressor, only the motor is changed, and the changed points are detailed hereinafter.

Rotor 17 of the synchronous motor comprises iron core 18 made of laminated magnetic steel sheets and shaft hole 19 for receiving shaft 4 to fit into core 18. Bored section 20 is provided at the end of core 18 in an axial direction. It is not shown in the drawings, but a part of bearing 6 of a cylinder block 5 extends inside bored section 20.

Two pieces of plate-type permanent magnet 21 butt each other and form angle a to shape in a hill. Two pairs of these magnets 21 are inserted into rotor 17. A first pair of two magnets are placed such that S pole faces outside the rotor and N pole faces inside the rotor. A second pair of two magnets are placed such that N pole faces outside the rotor and S pole faces inside the rotor. Thus the first pair forms a rotor pole and the second pair forms another pole, so that entire rotor 17 has two poles. The width of magnet 21 is referred to as "P".

A starter cage-shaped conductor is unitarily formed by aluminum diecasting comprising numbers of conductive bars 22 provided to core 18 and shorting grommets 23 covering both ends of core 18 in an axial direction.

Both end-faces of core 18 in the axial direction have protective terminal plates 24 made of non-magnetic material for securing magnets 21 from coming off. Barriers 25, for preventing magnetic flux between the permanent magnets from shorting, are provided to core 18. Barriers 25 are unitarily formed with the starter cage-shaped conductor by the aluminum diecasting.

The flow of magnetic flux from magnet 21 is schematically described with reference to FIG. 9 using the arrow marked lines. The magnetic flux from N poles of two magnets 21 placed at upper side of FIG. 9 travels mainly through the center section of core 18 and is attracted to S poles of two magnets 21 placed at lower side of FIG. 9. Thus the magnetic density through core section 18a around the outer rim 20a of bored section becomes substantially high.

As such, self-starting-synchronous type motor using permanent magnets can be used instead of the conventional induction motor. However, since bearing 6 made of iron-system material exists inside bored section 20, magnetic attraction works between the inner wall of bored section excited and the outer wall of bearing 6. The magnetic attraction produces loss torque which lowers the torque produced by the motor, and yet, magnetic flux of magnet 21 travels to bearing 6 and produces eddy-current-loss. The motor needs another power to compensate the loss torque and eddy-current-loss in order to continue operating, and this prevents the efficiency from increasing.

DISCLOSURE OF THE INVENTION

The present invention addresses the problem discussed above, and aims to provide a highly efficient electric compressor in which loss torque due to magnetic attraction and iron loss (particularly eddy-current-loss) in the bearing are reduced.

The compressor of the present invention comprises the following elements:
- a compressing section accommodated in a hermetic container; and
- a motor section for driving the compressing section and coupled to the compressing section.

The motor section includes a motor of two rotor poles, and the motor has a bored section at an end on the compressing section side and a rotor core in which permanent magnets are buried. The compressing section includes a bearing, made of non-magnetic material, extending inside the bored section.

This structure allows magnetic attraction not to work between an inner wall of the bored section and an outer wall of the bearing, so that no loss torque is produced. Since the bearing is made of non-magnetic material, magnetic flux from the permanent magnets are not attracted to the bearing and almost all the magnetic flux travels through the rotor core. Thus iron loss (particularly, eddy-current-loss) is rarely produced within the bearing. As a result, high efficiency of the motor is directly reflected to the compressor.

Another compressor comprises the following elements:
- a motor section including two rotor-poles, a rotor core in which permanent magnets are buried, and a bored section at an end on a compressing section side;
- a compressing section including a bearing, a part of which extends inside the bored section and at least the part is made of non-magnetic material.

This structure allows the magnetic attraction not to work between the inner wall of the bored section and the outer wall of the bearing, so that the loss torque is not produced. Further, the iron loss, the eddy-current-loss in particular, within the bearing due to the magnetic flux from the permanent magnets is prevented from being produced. In addition, inexpensive iron-system material can be used for the construction except for the extending portion of the bearing inside the bored section. The bearing can be unitarily formed with a cylinder block, thus a highly efficient and inexpensive compressor can be provided.

Still another compressor comprises the following elements:
- a motor section including a two-pole rotor, rotor core in which permanent magnets are buried;
- a compressing section including a bearing made of iron-system material, and the rotor core faces the bearing via annular space in a radius direction in the bored section.

The annular space allows magnetic flux on the rotor side to rarely flow to the bearing. Thus even the bearing is made of iron-system material, neither loss torque nor iron loss, eddy-current-loss in particular, in the bearing is produced. Therefore, efficiency of the motor is directly reflected to the compressor. Further, since the bearing can be made of iron casting, and formed unitarily with other sections, an inexpensive compressor can be provided.

DETAILED DESCRIPTION OF PREFERRED EMBODIMENTS

The exemplary embodiments of the present invention are demonstrated with reference to the accompanying drawings.

First Exemplary Embodiment

Figure 1:
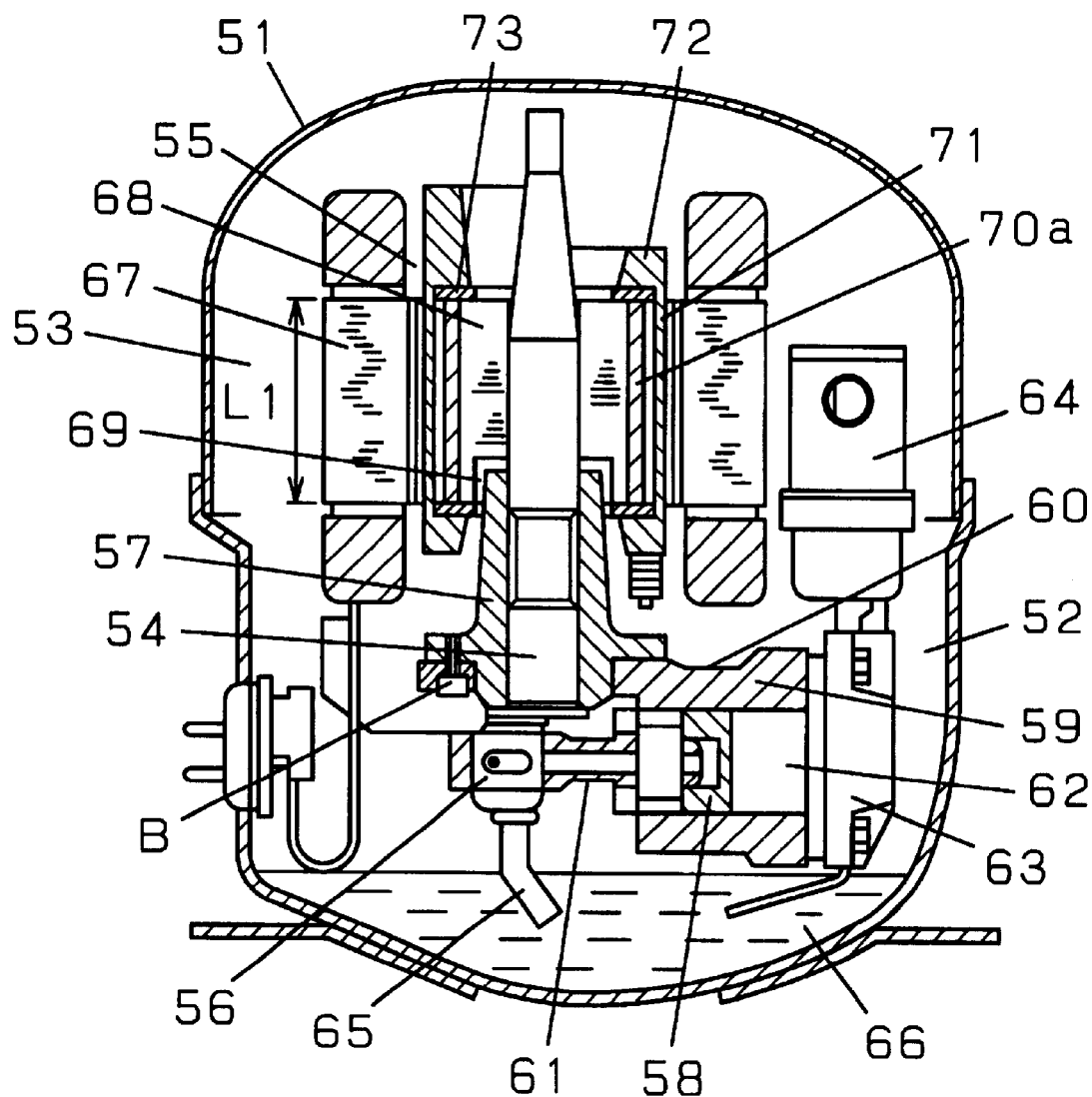
FIG. 1 is a vertical cross section of a compressor in accordance with a first exemplary embodiment of the present invention.
Figure 2:
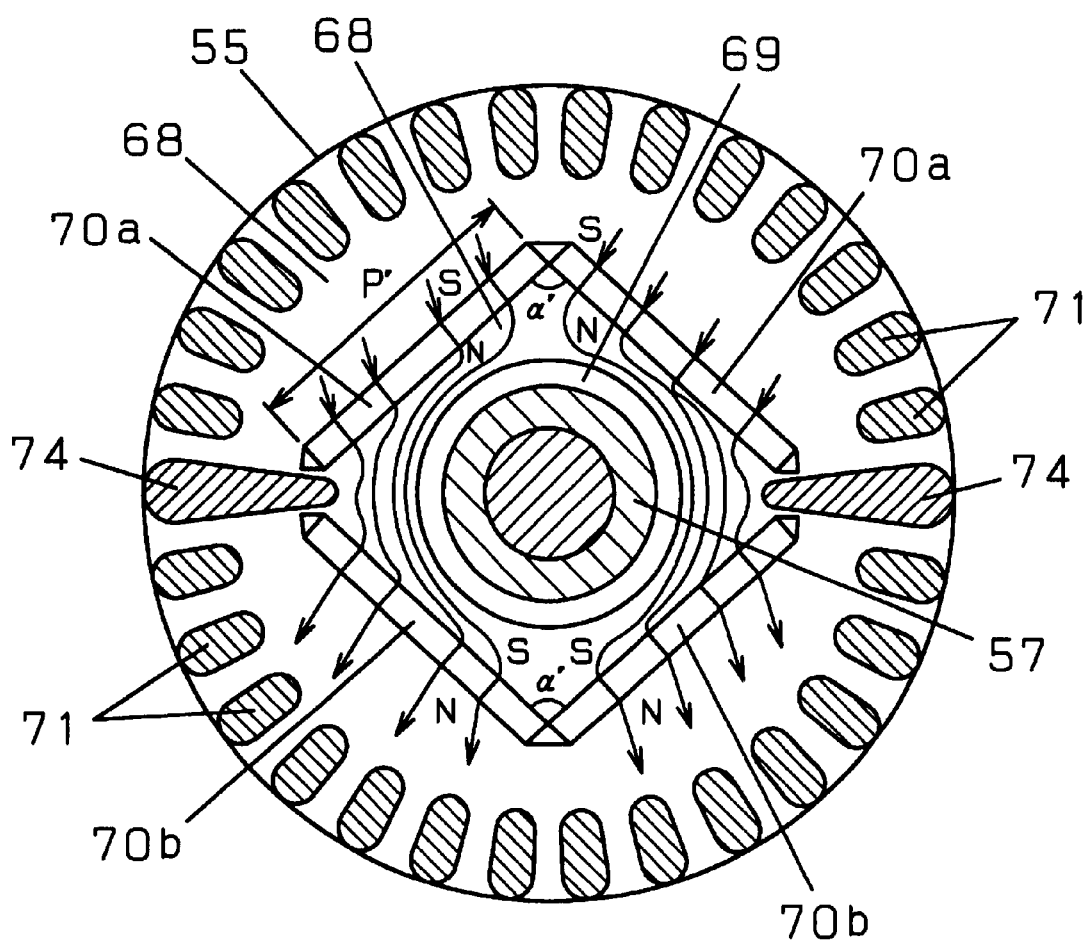
FIG. 2 is a lateral cross section of a rotor shown in FIG. 1.

FIG. 1 is a vertical cross section of a compressor in accordance with the first exemplary embodiment of the present invention, and FIG. 2 is a lateral cross section of a rotor shown in FIG. 1.

In FIG. 1, the compressor comprises the following elements:
- a compressing section 52 disposed at the lower section of hermetic container 51; and
- a self-starting-synchronous motor 53 having permanent magnets, the motor 53 being disposed above the compressing section 52. Shaft 54 mounted to rotor 55 of motor 53 has crank 56.

Compressing section 52 comprises the elements below:
- bearing 57, made of aluminum diecasting and non-magnetic material, in which shaft 54 is inserted; and
- cylinder block 60, made of iron-system casting, having cylinder 59 in which piston 58 slides.

Piston 58 is mounted to crank 56 via cylinder rod 61, so that compressing chamber 62 is formed in cylinder 59.

Bearing 57 is mounted to cylinder block 60 with bolt B. On the tip of cylinder 59, valve chamber 63 including a discharging valve and a sucking valve (both are not shown) is attached. Suction muffler 64 is mounted on the sucking valve side in valve chamber 63. On the tip of crank 56, oil pipe 65 is attached for guiding lubricant 66 pooled in the bottom of container 51 to the sliding parts of compressing section 52, so that smooth lubrication is expected.

Motor 53 comprises the following elements:
- stator 67 including stator core made of laminated magnetic steel sheets having thickness L1, where a winding is wound on the core; and
- rotor 55 including rotor core 68 made of laminated magnetic steel sheets.

On the compressing section side of rotor 55, bored section 69 is formed, and a part of bearing 57 extends inside bored section 69.

Rotor 55 is detailed with reference to FIG. 2. In rotor core 68, two pairs of permanent magnets 70a and 70b are buried as follows: Magnets 70a and 70b are plate-shaped rare earth magnet made of neodymium-iron-boron system ferromagnet. Two pieces of the magnets are butted each other to form a hill with angle α', and they are buried axially in rotor core 68. First pair 70a is buried such that S pole faces outward of the rotor, and N pole faces inward of the rotor. Second pair 70b is buried such that N pole faces outward of the rotor, and S pole faces inward of the rotor. As such, the first pair forms one rotor pole and the second pair forms another rotor pole. Eventually, the entire rotor 55 has two poles. Width of each magnet is referred to as P'.

Magnets 70a and 70b can be magnetized before they are inserted into rotor core 68 or after the insertion. It is preferable to magnetize the magnetic substance to be a permanent magnet after the substance is inserted and fixed because better operation is expected.

One pair of magnets are placed to shape in a hill, thereby forming one rotor pole; however, an arc-shaped one piece of magnet can be used because it can also form one rotor pole.

In this embodiment, magnets of one pair are disposed in a hill shape to form one rotor pole; however, one piece of an arc-shaped permanent magnet may form one rotor pole.

Numbers of conductive bars 71 are provided to rotor core 68, and shorting grommets 72 cover both ends in an axial direction of rotor core 68. Bars 71 and grommets 72 are unitarily formed by aluminum diecasting, so that a starter cage-shaped conductor is formed. Terminal plates 73 made of non-magnetic material are disposed at both the ends of buried magnets 70a and 70b in the axial direction in order to secure the magnets from coming off. Between adjacent magnet pairs 70a and 70b, as shown in FIG. 2, barriers 74 for preventing the magnetic fluxes from shorting between the magnets are provided in slot-shaped holes formed in the axial direction of rotor core 68. When the starter cage-shaped conductor is formed, the aluminum diecasting is filled into these holes to form barriers 74.

The flows of magnetic fluxes of magnets 70a and 70b are described schematically using arrow marked lines in FIG. 2.

The magnetic fluxes from N pole of two magnets 70a shown in the upper section of FIG. 2 travel through rotor core 68 around the rim of bored section 69 in a concentrated manner, and are attracted to S pole of two magnets 70b shown in lower section of FIG. 2.

At this time, narrow magnetic paths are partially formed in rotor core 68, thus magnetic flux density becomes excessively high. However, since bearing 57 extending inside bored section 69 is made of aluminum diecasting, i.e. non-magnetic material, magnetic attraction does not work between an inner wall of bored section 69 and an outer wall of bearing 57, so that no loss torque is produced. Further, bearing 57 does not attract the magnetic fluxes, therefore, eddy-current-loss within bearing 57—due to flowing of magnetic fluxes into bearing 57—does not occur.

High efficiency of synchronous motor 53 using the permanent magnets is thus reflected to the compressor. As a result, a highly efficient compressor is obtainable.

Second Exemplary Embodiment

Figure 3:
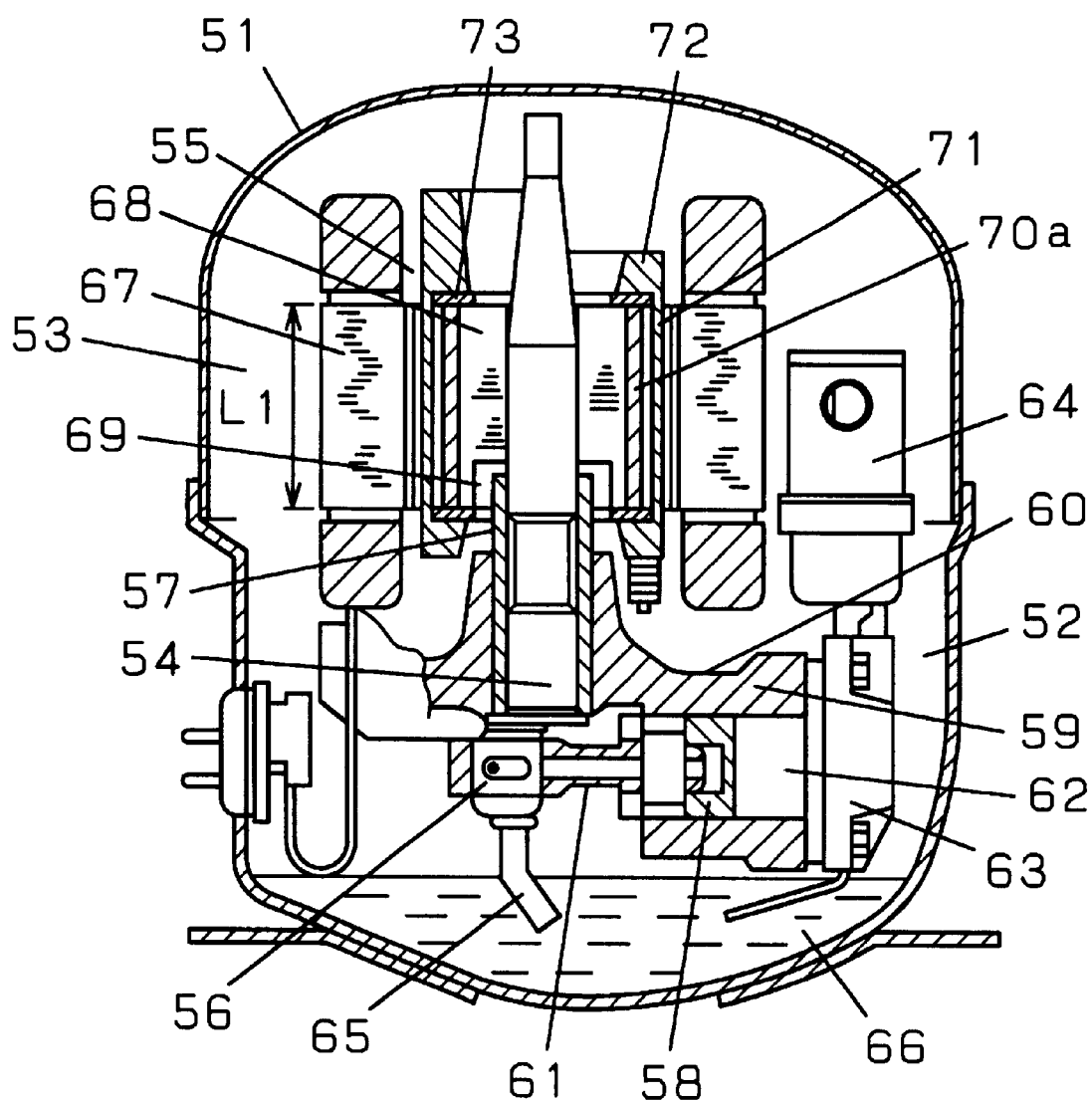
FIG. 3 is a vertical cross section of a compressor in accordance with a second exemplary embodiment of the present invention.

FIG. 3 is a vertical cross section of a compressor in accordance with the second exemplary embodiment of the present invention. This second embodiment differs from the first one in the following points:

In the first embodiment, as shown in FIG. 1, bearing 57 is fixed to cylinder block 60 with bolt B; however, in the second embodiment shown in FIG. 3, bearing 57 can be press-fit or shrinkage-fit in cylinder block 60. Other elements working in the same way as those in the first embodiment bear the same reference marks as the first embodiment, and the descriptions thereof are thus omitted. They produce the same advantage as they did in the first embodiment.

Third Exemplary Embodiment

Figure 4:
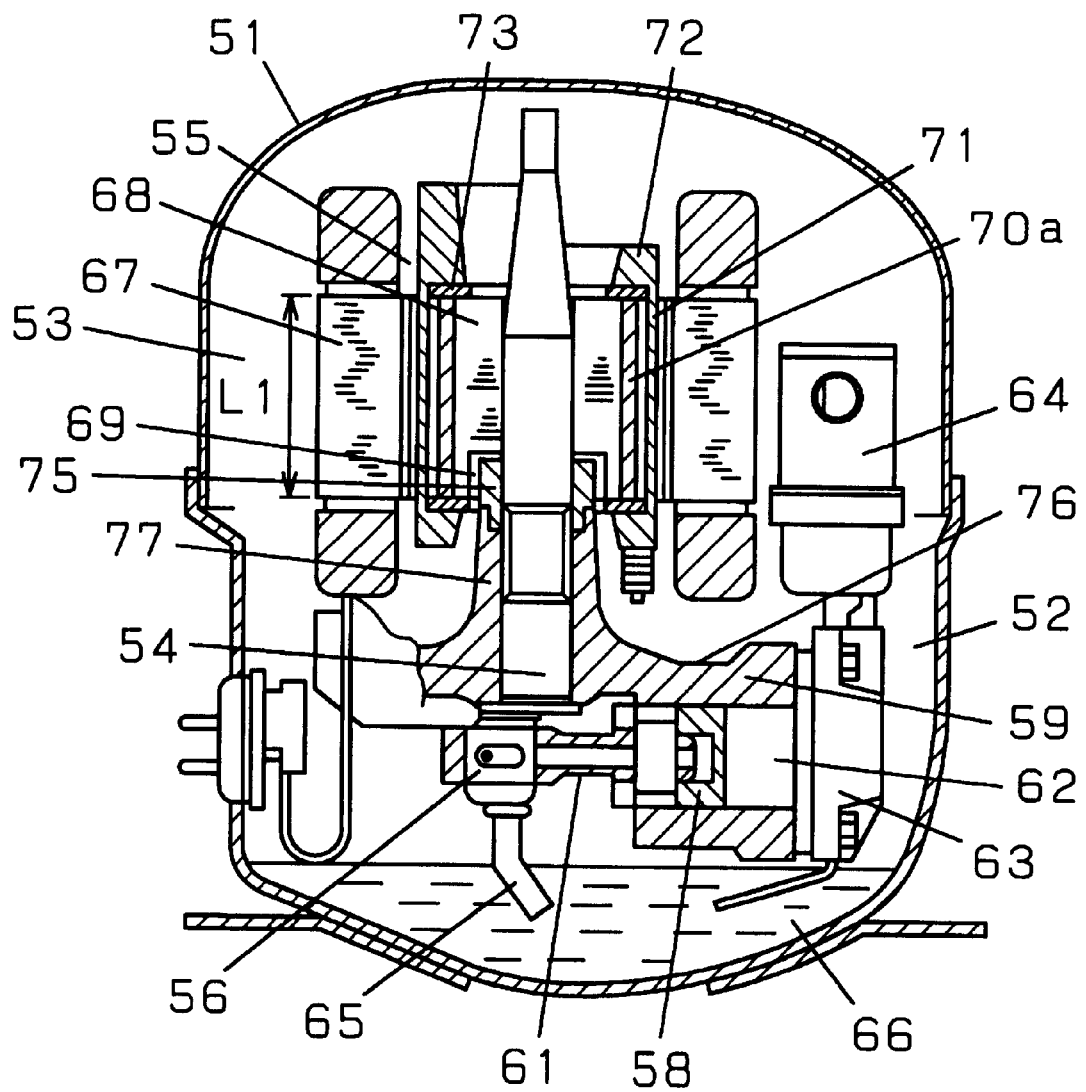
FIG. 4 is a vertical cross section of a compressor in accordance with a third exemplary embodiment of the present invention.

FIG. 4 is a vertical cross section of a compressor in accordance with the third exemplary embodiment of the present invention.

In FIG. 4, the elements working in the same way as those in the first embodiment shown in FIG. 1 bear the same reference marks as in the first embodiment, and the descriptions thereof are thus omitted.

First bearing 75 is made of non-magnetic material such as aluminum diecasting and shaft 54 is inserted therein. Cylinder block 76 is made of iron-system casting, and includes cylinder 59 and second bearing 77 in which shaft 54 is inserted. Cylinder 59 forms compressing chamber 62 by siding piston 58 which is mounted to crank 56 of shaft 54 via connecting rod 61. First bearing 75 extends inside bored section 69 of rotor core 68, and fits in second bearing 77 of cylinder block 76 outside bored section 69.

This structure allows magnetic attraction not to work between an inner wall of bored section 69 and an outer wall of bearing 75, so that neither loss torque nor eddy-current-loss within bearing 75 occurs, and thus a highly efficient compressor is obtainable.

The above description tells that bearing 75 is made of aluminum-system material; however, the material may be other non-magnetic materials such as copper-system, ceramic substances. Only first bearing 75 can be made of non-magnetic material, and second bearing 77 and cylinder block 76 are unitarily formed—both the elements can be made of inexpensive iron-system material. As a result, a highly efficient and inexpensive compressor is obtainable.

Fourth Exemplary Embodiment

Figure 5:
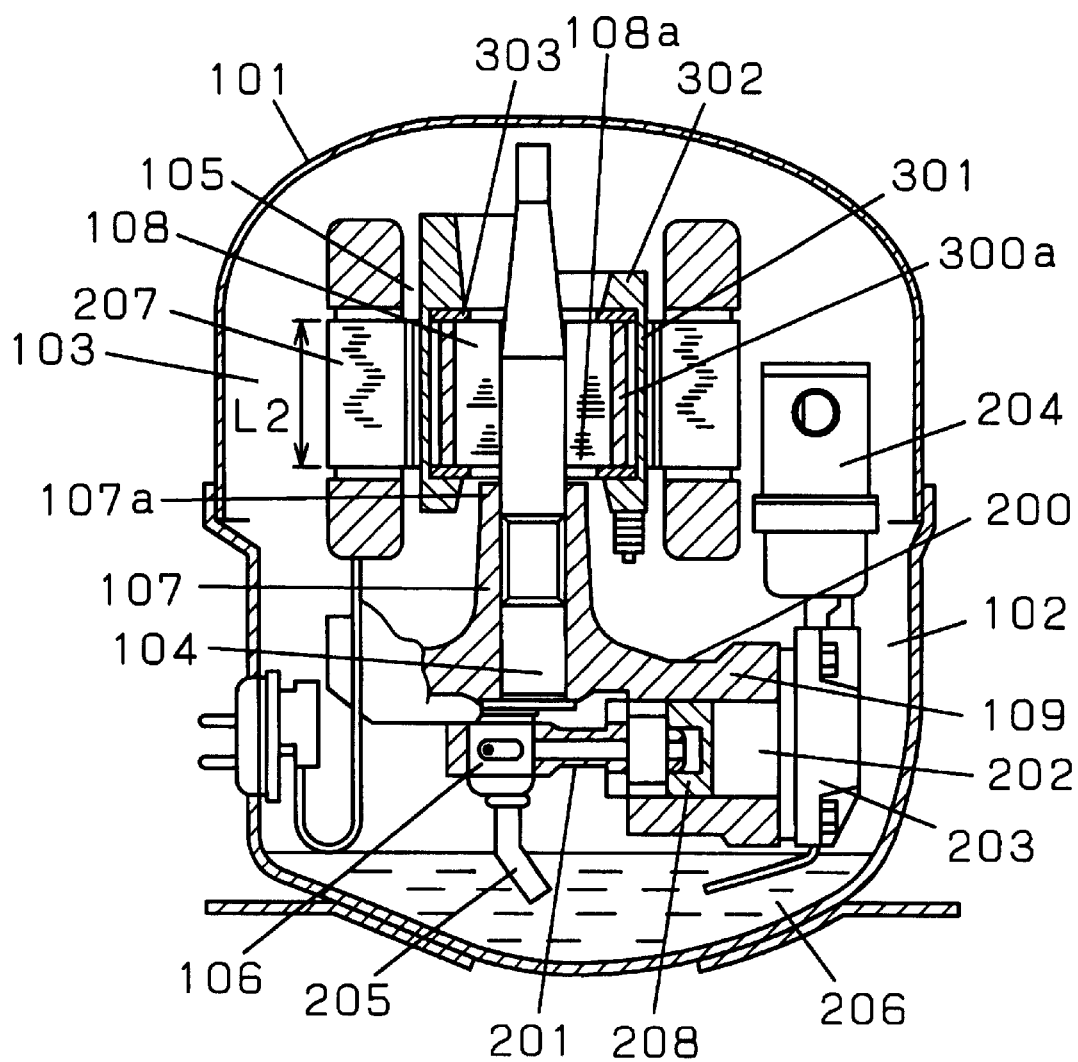
FIG. 5 is a vertical cross section of a compressor in accordance with a fourth exemplary embodiment of the present invention.
Figure 6:
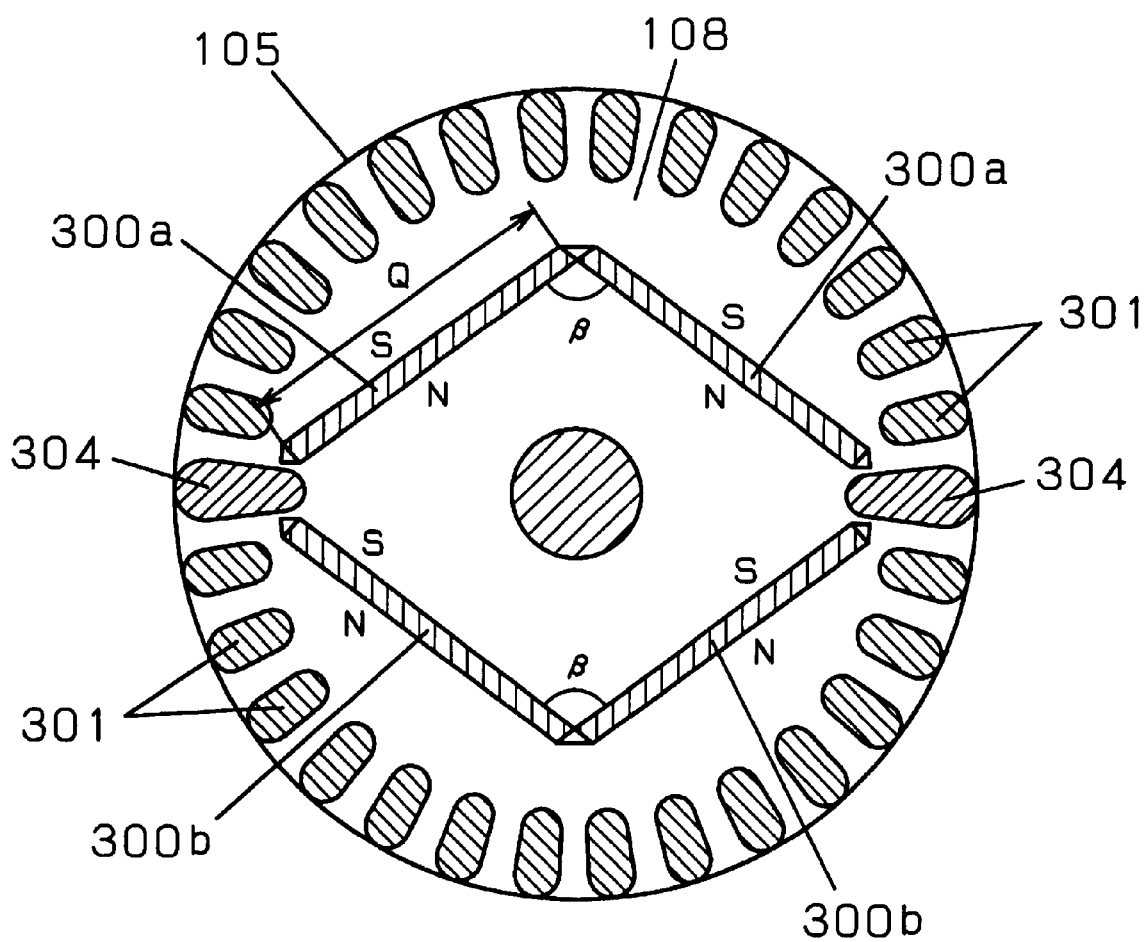
FIG. 6 is a lateral cross section of a rotor shown in FIG. 5.
Figure 7:
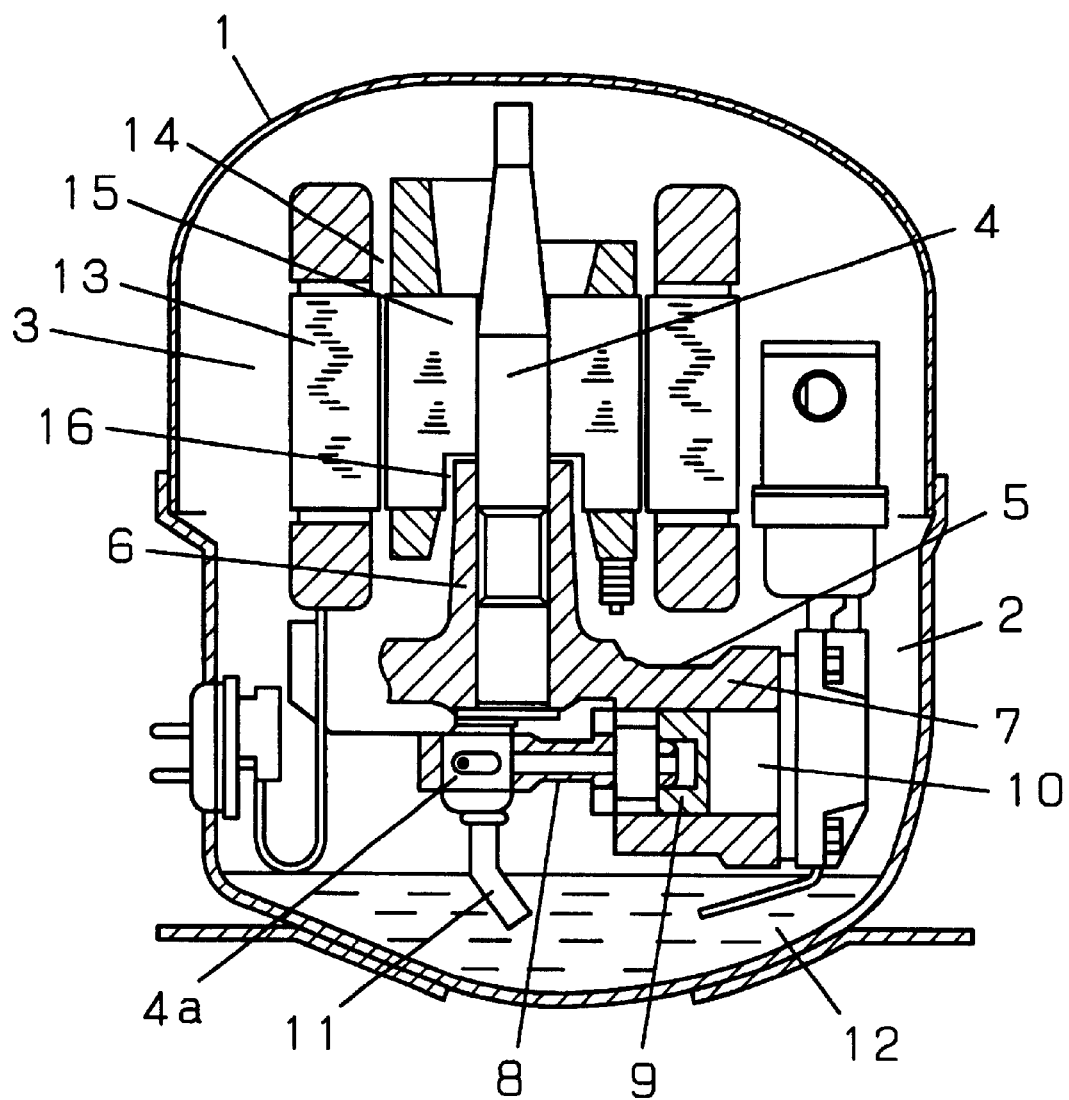
FIG. 7 is a vertical cross section of a conventional compressor.
Figure 8:
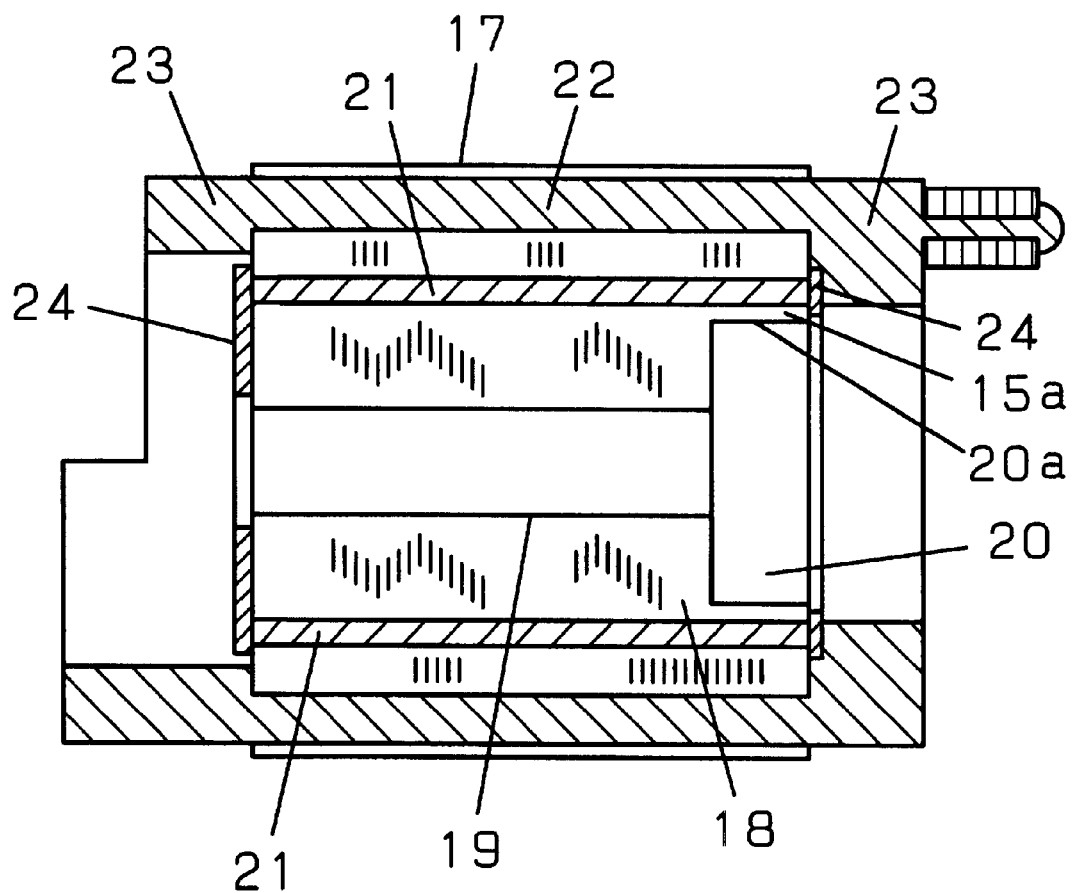
FIG. 8 is a cross section of a rotor taken along an axial direction in a conventional two-pole self-starting-synchronous motor having permanent magnets.
Figure 9:
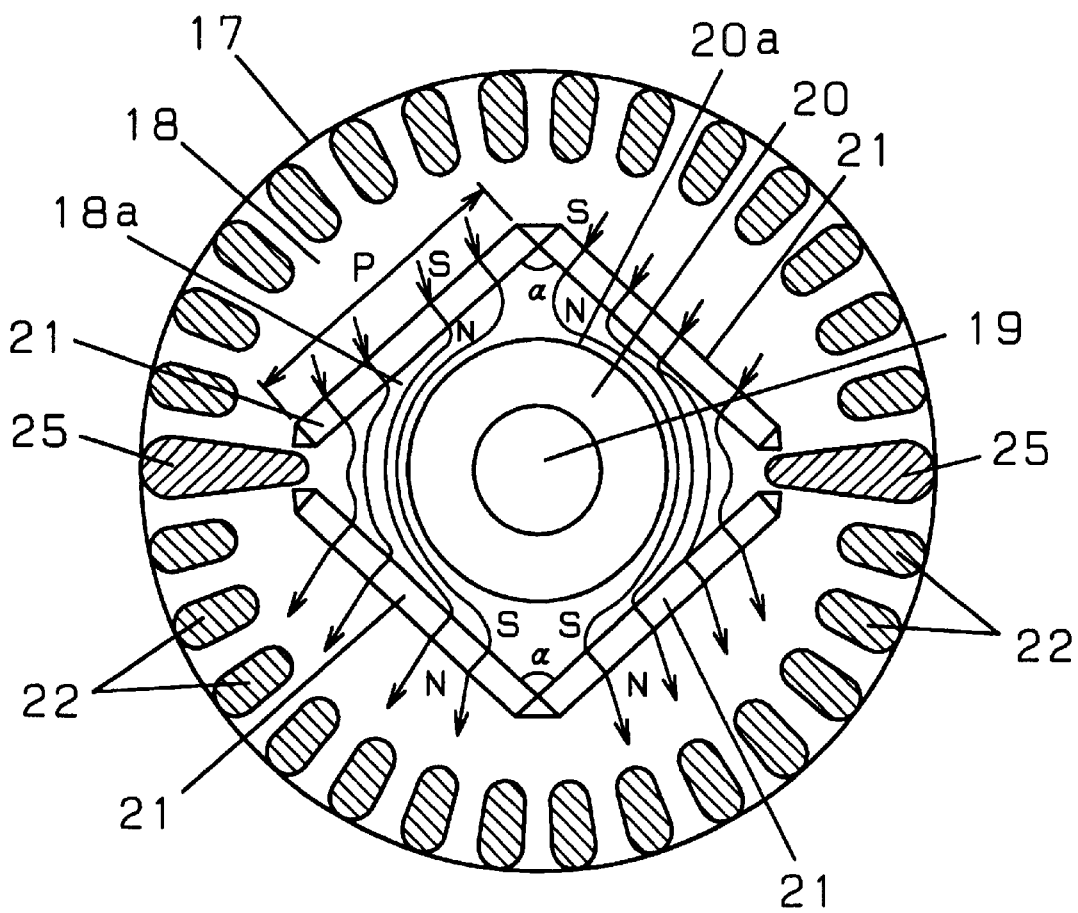
FIG. 9 is a lateral cross section of a conventional rotor.

FIG. 5 is a vertical cross section of a compressor in accordance with the fourth exemplary embodiment of the present invention. FIG. 6 is a lateral cross section of a rotor shown in FIG. 5.

In FIG. 5, a compressor comprises compressing section 102 disposed at the lower part of hermitic container 101 and self-starting synchronous motor 103 having permanent magnets disposed above compressing section 102. Shaft 104 mounted to rotor 105 of motor 103 includes crank 106.

Shaft 104 is inserted into bearing 107, which is made of iron-system casting, and bearing 107 is unitarily formed with cylinder block 200 having cylinder 109, in which piston 208 slides. Piston 208 is mounted to crank 106 via connecting rod 201, so that compressing chamber 202 is formed in cylinder 200.

On the tip of cylinder 200, valve chamber 63 including a discharging valve and a sucking valve (both are not shown) is attached. Suction muffler 204 is mounted on the sucking valve side in valve chamber 203. On the tip of crank 106, oil pipe 205 is attached for guiding lubricant 206 pooled in the bottom of container 101 to the sliding parts of compressing section 102, so that smooth lubrication is expected.

Motor 103 comprises the following elements:

stator 207 including stator core made of laminated magnetic steel sheets having thickness L2, where a winding is wound on the core; and rotor 105 including rotor core 108 made of laminated magnetic steel sheets.

In this fourth embodiment, rotor 105 does not have bored section, and end face 107a of bearing 107 on the motor side is distantly disposed from end face 108a of rotor core 108, so that space exists between end face 107a and end face 108a in an axial direction.

Construction of rotor 105 is detailed with reference to FIG. 6. In rotor core 108, two pairs of permanent magnets 300a and 300b are buried as follows: Magnets 300a and 300b are plate-shaped rare earth magnet made of neodymium-iron-boron system ferro-magnet. Two pieces of the magnets are butted each other to form a hill with angle 3, and they are buried axially in rotor core 108. First pair 300a is buried such that S pole faces outward of the rotor, and N pole faces inward of the rotor. Second pair 300b is buried such that N pole faces outward of the rotor, and S pole faces inward of the rotor. As such, the first pair forms one rotor pole and the second pair forms another rotor pole. Eventually, the entire rotor 105 has two poles. Width of each magnet is referred to as Q.

Magnets 300a and 300b can be magnetized before they are inserted into rotor core 108 or after the insertion. It is preferable to magnetize the magnetic substance to be a permanent magnet after the substance is inserted and fixed because better operation is expected.

One pair of magnets are placed to shape in a hill, thereby forming one rotor pole; however, an arc-shaped one piece of magnet can be used because it can also form one rotor pole.

Numbers of conductive bars 301 are provided to rotor core 108, and shorting grommets 302 cover both ends in an axial direction of rotor core 105. Bars 301 and grommets 302 are unitarily formed by aluminum diecasting, so that a starter cage-shaped conductor is formed. Terminal plates 303 made of non-magnetic material are disposed at both the ends of buried magnets 300a and 300b in the axial direction in order to secure the magnets from coming off.

Between adjacent magnet pairs 300a and 300b, as shown in FIG. 6, barriers 304 for preventing the magnetic fluxes from shorting between the magnets are provided in slot-shaped holes formed in the axial direction of rotor core 108. When the starter cage-shaped conductor is formed, the aluminum diecasting is filled in these holes to form barriers 304.

When this fourth embodiment is compared with the previous ones, the following relations are established: L2<L1, $\beta>\alpha'$, and Q>P'. The amount of magnetic flux—generated from the permanent magnets—taken out from rotor 105 is almost proportionate to magnet-pole-area, i.e. a product of width of the magnet and its axial length. Thus in this fourth embodiment, butting angle is widened from $\alpha'$ to $\beta$, and the width of the permanent magnet is widened from P' to Q, thereby reducing an axial length of the magnet. As a result, the thickness of the laminated magnetic steel sheets of rotor core 108 can be reduced.

On the other hand, the thickness of the laminated magnetic steel sheets of stator 207 can be reduced from L1 to L2 by widening a magnetic path of stator core corresponding to the magnetic pole area of rotor core 108. As a result, the thickness of stator core 207 corresponds to the thickness of rotor core 108, so that the thickness of bored section 69 described in the previous embodiments can be eliminated, i.e., the height of the compressor can be reduced due to no bored section.

Loss torque due to magnetic attraction, or eddy-current-loss in bearing 107 is produced by leakage fluxes from the end face of rotor core 108. Even bearing 107 is made of iron-system material, its end face 107a is disposed distantly from end face 108a of rotor core 108, so that the loss torque or eddy-current-loss is a negligible small amount comparing with the bearing made of iron-system material and extending inside the bored section.

Bearing 107 can be thus made of inexpensive material of iron-system casting and also unitarily formed with cylinder block 20. Further, since there is no bored section in the rotor, the rotor can be manufactured with ease. As a result, a highly efficient and inexpensive compressor is obtainable.

In the previous embodiments, i.e., from the first embodiment to the fourth one, the self-starting synchronous motor using the permanent magnets is used as an example. However, a dc brush-less motor having two poles can produce the same advantage provided that the permanent magnets are used in the same way, and positional relations between the bored section and the bearing are set in the same manner as those embodiments. Because the dc brush-less motor only does not have conductive bars or shorting grommet, i.e., cage-shaped conductor for starting, on the other hand, it has permanent magnets buried in a rotor, and this structure is common to the self-starting synchronous motor.

Also in the previous embodiments, the permanent magnets made of rare-earth-magnet are used. Since the rare-earth-magnet can produce strong magnetic force, the motor and the compressor can be downsized and light weighted.

Industrial Applicability

This compressor comprises a compressing section accommodated in a hermetic container and a motor section—coupled to the compressing section—for driving the compressing section. The motor section has a bored section on an end of the compressing section side and a motor having two rotor poles and also including a rotor core in which permanent magnets are buried. The compressing section includes a bearing made of non-magnetic material and extending inside the bored section. This structure reduces both of loss torque due to magnetic attraction between an inner wall of the bored section and the bearing, and eddy-current-loss in the bearing, so that a highly efficient compressor is obtainable.

What is claimed is:

1. A compressor comprising:
   a compressing section accommodated in a hermetic container; and
   a motor section, coupled to said compressing section, for driving said compressing section, said motor section including:
      a bored section on an end of the compressing section side;
      a motor having two pole of a rotor and a rotor core in which a permanent magnet is buried,
   wherein said compressing section includes a bearing made of non-magnetic material and extending inside the bored section.

2. A compressor comprising:
   a compressing section accommodated in a hermetic container; and
   a motor section, coupled to said compressing section, for driving said compressing section, said motor section including:

a bored section on an end of the compressing section side;

a motor having two pole of a rotor and a rotor core in which a permanent magnet is buried, wherein said compressing section includes a bearing of which part extends inside the bored section, and at least the part is made of non-magnetic material.

3. A compressor comprising:

a compressing section accommodated in a hermetic container; and a motor section, coupled to said compressing section, for driving said compressing section, said motor section including:

a motor having two pole of a rotor and a rotor core in which a permanent magnet is buried, wherein said compressing section includes a bearing made of iron-system material, and an end face of the rotor core confronts an end face of the bearing via axial space.

4. The compressor as defined in claims 1, 2 or 3, further comprising a plurality of cage-shaped starting conductive bars around an outer rim of the iron core, wherein the rotor has a plurality of permanent magnets buried inside of the conductive bars.

5. The compressor as defined in claims 1, 2 or 3, wherein the permanent magnets are made of rare-earth-magnet.

6. The compressor as defined in claim 4, wherein the permanent magnets are made of rare-earth-magnet.

* * * * *